US012208593B2

(12) United States Patent
Peterlini

(10) Patent No.: US 12,208,593 B2
(45) Date of Patent: Jan. 28, 2025

(54) DEVICE FOR PRODUCING A WEDGING ELEMENT

(71) Applicant: GP System, Annecy (FR)

(72) Inventor: Jacky Peterlini, Annecy le Vieux (FR)

(73) Assignee: GP System (FR)

( * ) Notice: Subject to any disclaimer, the term of this patent is extended or adjusted under 35 U.S.C. 154(b) by 101 days.

(21) Appl. No.: 17/761,106

(22) PCT Filed: Sep. 17, 2020

(86) PCT No.: PCT/EP2020/075955
§ 371 (c)(1),
(2) Date: Mar. 16, 2022

(87) PCT Pub. No.: WO2021/053064
PCT Pub. Date: Mar. 25, 2021

(65) Prior Publication Data

US 2022/0371298 A1 Nov. 24, 2022

(30) Foreign Application Priority Data

Sep. 17, 2019 (FR) ....................................... 1910254

(51) Int. Cl.
*B31D 5/00* (2017.01)

(52) U.S. Cl.
CPC .... *B31D 5/0052* (2013.01); *B31D 2205/0047* (2013.01)

(58) Field of Classification Search
CPC .......... B31D 5/0043; B31D 2205/0047; B31D 5/0052
See application file for complete search history.

(56) References Cited

U.S. PATENT DOCUMENTS

| | | | | |
|---|---|---|---|---|
| 11,279,107 B2 * | 3/2022 | Corbin | B26D 1/085 | |
| 2009/0075800 A1 * | 3/2009 | Wetsch | B31D 5/006 | 493/464 |
| 2011/0053743 A1 * | 3/2011 | Wetsch | B31D 5/0052 | 493/464 |
| 2011/0053751 A1 * | 3/2011 | Arora | B31D 5/0047 | 493/464 |
| 2013/0092716 A1 * | 4/2013 | Wetsch | A47K 10/32 | 225/77 |
| 2017/0183139 A1 * | 6/2017 | Wetsch | B65B 57/12 | |

FOREIGN PATENT DOCUMENTS

| | | | |
|---|---|---|---|
| DE | 19858537 A1 * | 6/2000 | B31D 5/0052 |
| DE | 102018110595 A1 | 12/2018 | |
| GB | 2508267 A * | 5/2014 | B31D 5/0039 |
| WO | WO 2018115746 A1 | 6/2018 | |

OTHER PUBLICATIONS

International Search Report of International Application No. PCT/EP2020/075955 dated Dec. 3, 2020 and English Translation (4 pages).

* cited by examiner

*Primary Examiner* — Thomas M Wittenschlaeger
*Assistant Examiner* — Himchan Song
(74) *Attorney, Agent, or Firm* — Lippes Mathias LLP

(57) ABSTRACT

A device for the production of padding product, including a product guide, a product drive along a drive axis (Y), a device for crumpling the product, which is designed to be alternatively, by a back-and-forth motion, in a position that constrains the product and a product release position.

9 Claims, 4 Drawing Sheets

[Fig. 1]
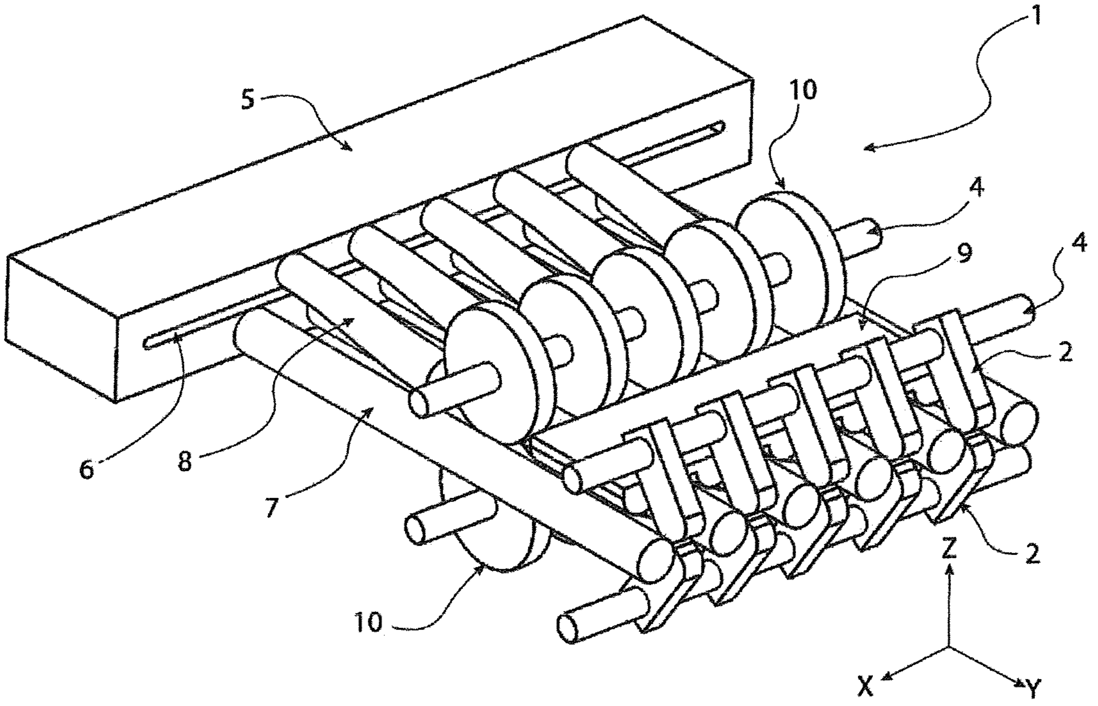
[Fig. 2]
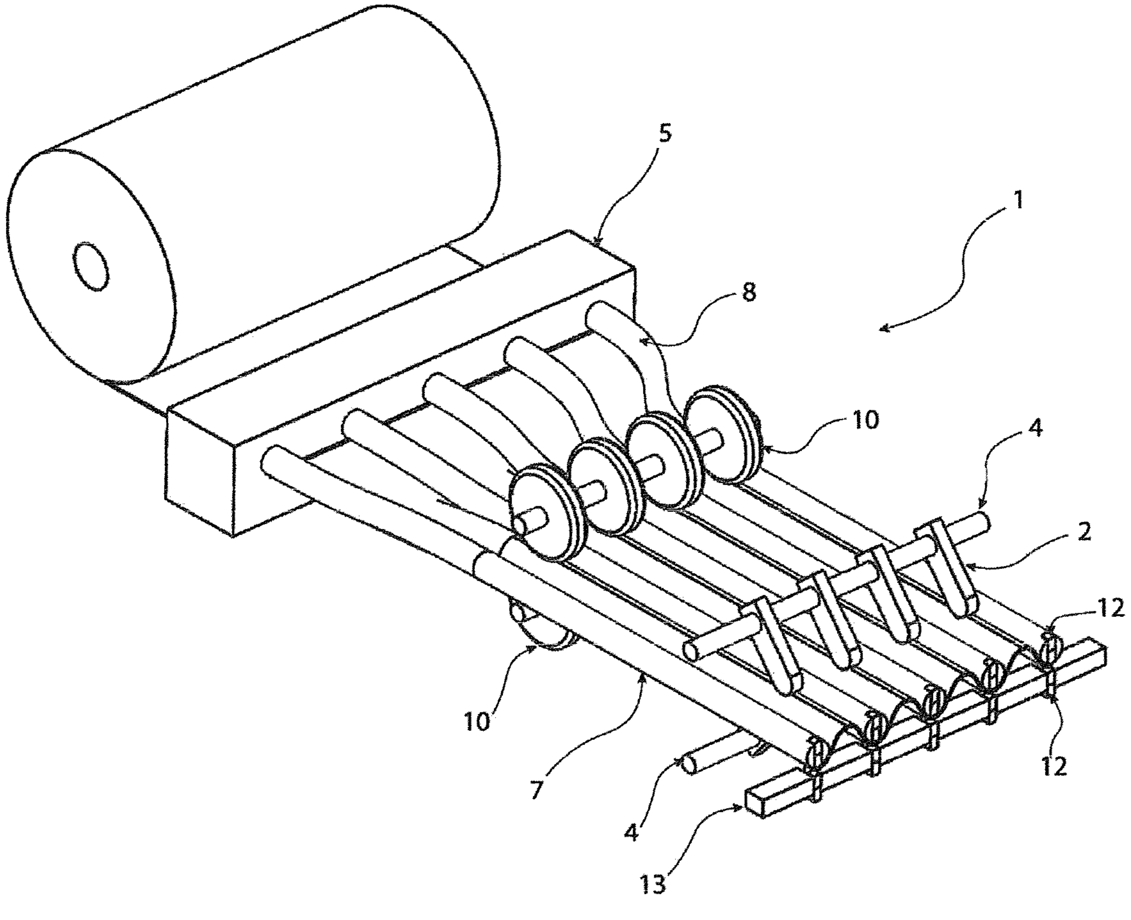

[Fig. 3]
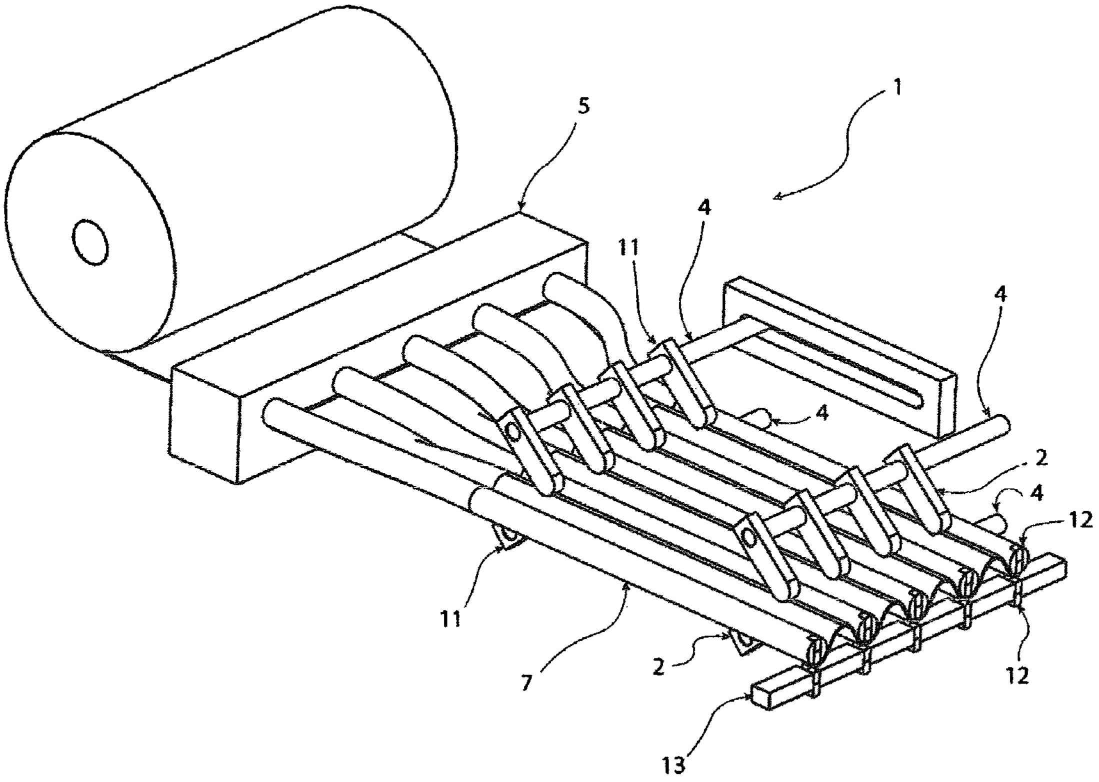
[Fig. 4]
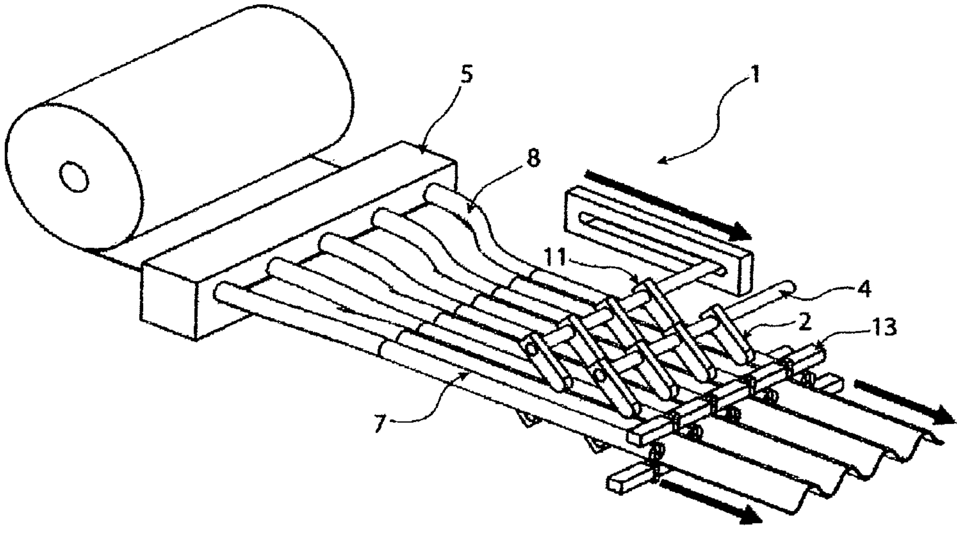

[Fig. 5]
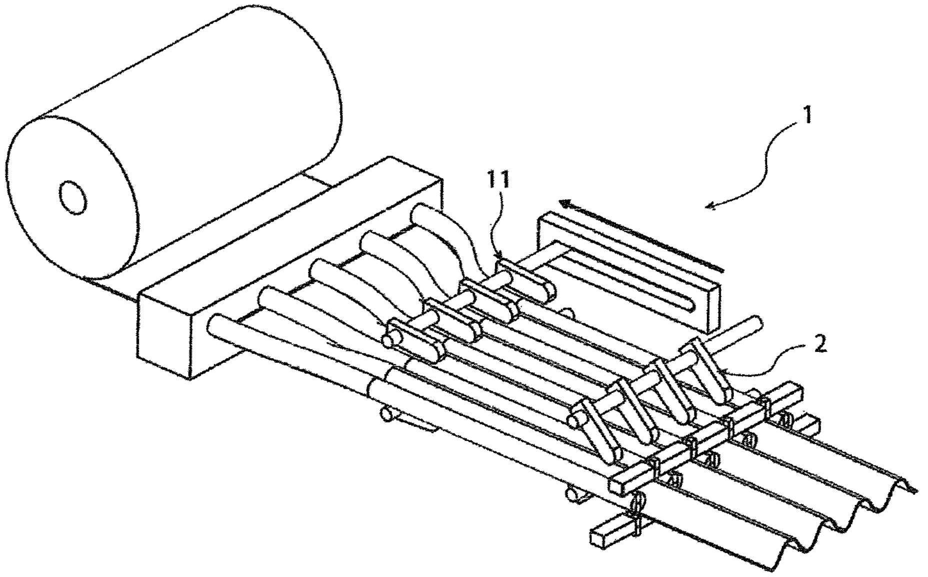
[Fig. 6]
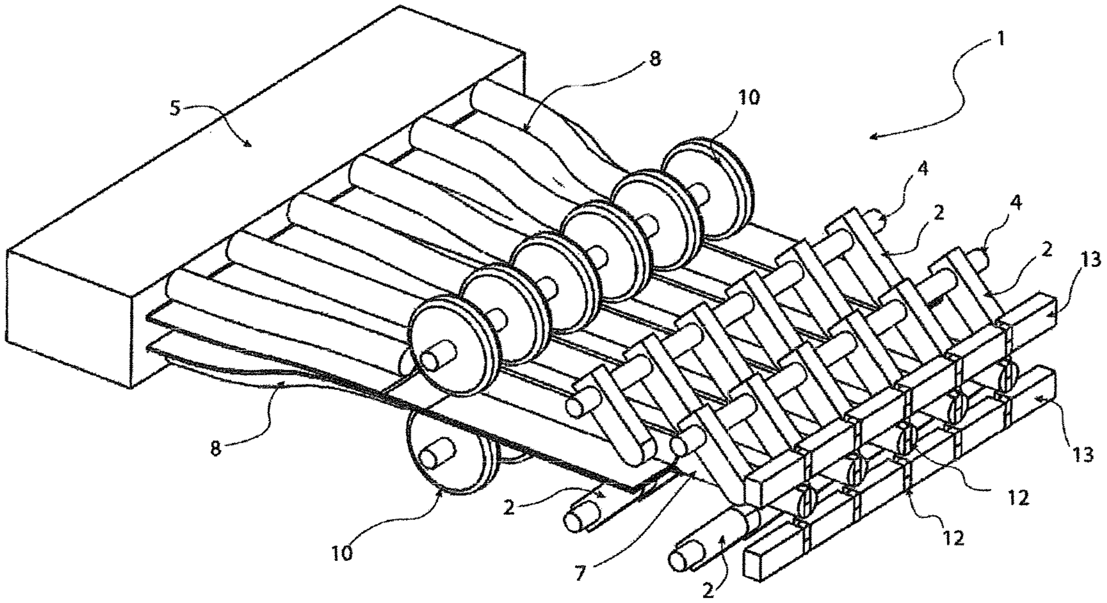

[Fig. 7]
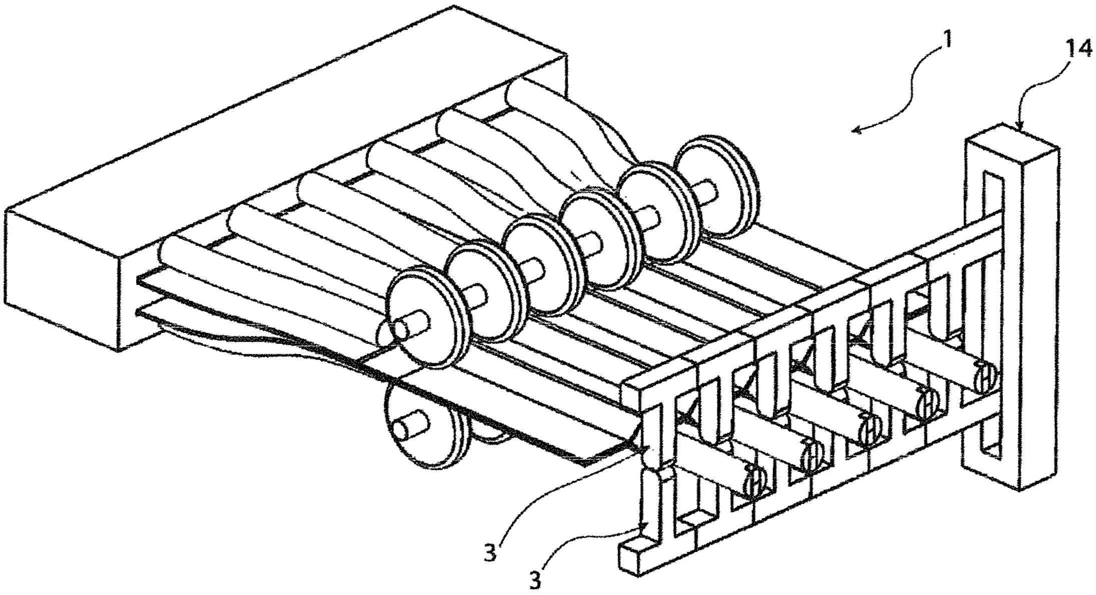
[Fig. 8]
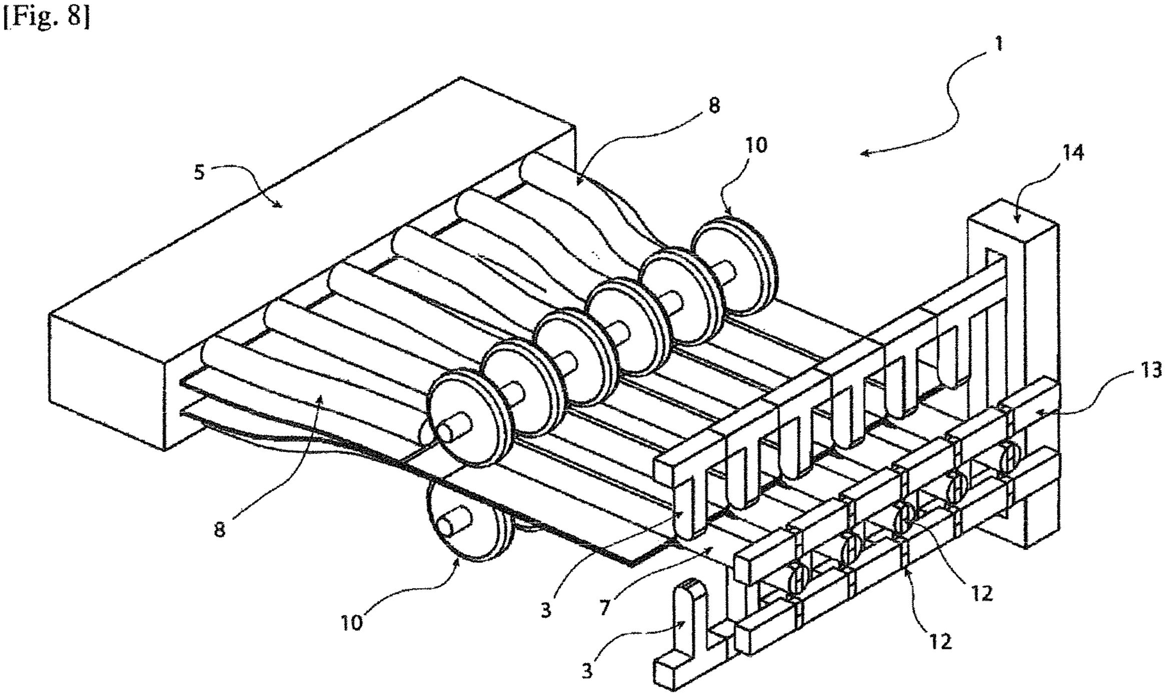

DEVICE FOR PRODUCING A WEDGING ELEMENT

BACKGROUND OF THE DISCLOSURE

The present invention concerns a device for producing a component of stuffing or padding by crumpling of a product.

The placement of stuffing or padding components in a carton, fills voids in a carton by being positioned outside of items to be packaged for their protection during transport and handling operations.

Although the manufacture of these components using sheets of crumpled paper is becoming more widespread, padding components made of plastic material in the shape of flakes or bubble wrap, or even an inflated pocket, are still widely used by distribution companies, in particular online sales agents.

The dramatic environmental impact of these plastic components, which represent considerable volumes, needs no further demonstration. Solutions for substitution that have less of an impact on the environment and which are industrially viable must be developed to serve as short-term replacements for these plastic stuffing and padding components.

One of the drawbacks of producing crumpled paper padding components is the risk of paper jamming during the paper strip drive and crumpling operations.

Paper jamming can occur both in the paper drive and during the crumpling and cutting operations.

A conventional device conventionnel for distributing a crumpled paper padding component comprises, as a drive means and a means of crumpling, sets of wheels that drive the paper upstream and which crumple the product downstream.

Therefore the product is continuously constrained between these two sets of drive wheels on the one hand and crumpling wheels on the other hand.

These permanent contacts of the wheels with the product therefore cause wear and risks of paper jamming, causing production breakdowns, limiting yield and inherently increasing production and maintenance costs.

Document DE 198 58 537 describes a device for the production of corrugated sheets, comprising two drive rollers that guide the product in the direction of a flap, which, against the pressure of a spring, stops the paper strip until the pressure of the paper strip is greater than the force of the spring, so that the crumpled paper strip is released.

Document DE 10 2018 110595 describes a production device for padding components that consists of a pair of rollers that drives a strip of paper in the direction of an accumulation device in which a counter-pressure that opposes the intake is exercised on the paper strip to crumple it. The counter-pressure is exercised using a spring flap provided at the output end of the accumulation device.

Document GB 2 508 267 discloses a production device for padding components that comprises two sets of rollers mounted on springs. The first set of rollers drives the product towards the second set of rollers which crumples the product.

The flaps and the sets of rollers, as a means of crumpling documents indicated above, are passive components that are powered by the resistance of the springs onto which they are fastened, by the passage of padding components. No active control of the mobility of the crumpling means is conducted.

BRIEF SUMMARY OF THE DISCLOSURE

The present invention proposes a production device for stuffing and padding components that remedies the aforementioned drawbacks.

This way the production device for stuffing product according to the invention comprises a product guide means, a product drive means along one drive axis, and a means of crumpling the product, with the means of crumpling being designed to be alternatively, by a back-and-forth motion, in a product constraining position and a product release position, characterized by the fact that the back-and-forth motion of the means of crumpling is controlled by a control cell.

According to one characteristic, the means of crumpling is controlled by a motor connected to an engine control board which is controlled by a PLC.

According to one additional characteristic the means of crumpling is moveable along a vertical axis that is perpendicular to the drive axis.

According to one other characteristic, the means of crumpling is moveable along the drive axis.

According to one additional characteristic, the means of crumpling is moveable along a transverse axis perpendicular to the drive axis.

According to some manners of embodiment, the means of crumpling comprises a series of crumpling flaps or crumpling rods distributed along a transverse axis perpendicular to the drive axis.

According to the preceding manners of embodiment, the means of crumpling comprises a multitude of series of crumpling flaps or crumpling rods arranged in parallel along the drive axis.

According to the preceding manners of embodiment, the crumpling flaps or the crumpling rods in a series, are moveable two by two as they get closer to each other along a transverse axis perpendicular to the drive axis.

According to one additional characteristic, the drive means is configured so that it moves at least one sheet of paper in both directions along the drive axis.

According to one manner of execution, the guide means comprises crumpling guides that extend in the direction of the drive axis.

According to the preceding manner of execution, the crumpling guides are fastened at one end to a shaping block and are free at their other end.

According to one characteristic, the guide means comprises an additional crumpling guide arranged facing the crumpling guides and upstream from the means of crumpling.

According to some manners of execution, the drive means is moveable by translational movements at least along the drive axis.

According to the preceding manners of execution, the drive means is designed to adopt a position constraining the product and a release position of the product.

BRIEF DESCRIPTION OF THE DRAWINGS

The implementation of the invention will be better understood through the use of the detailed description which is revealed hereinafter by looking at the attached drawings in which:

FIGS. 1 through 8 illustrate production devices for stuffing component according to the manners of embodiment of the invention.

FIG. 1 is a perspective view according to a first manner of embodiment.

FIG. 2 is a perspective view according to a second manner of embodiment.

FIGS. 3 through 5 are perspective views according to a third manner of embodiment, which illustrate the functioning of a drive means.

FIG. 3 illustrates the drive means in a retracted position in contact with the product.

FIG. 4 illustrates the drive means in a travel position in contact with the product.

FIG. 5 illustrates the drive means in a retracted position.

FIG. 6 is a perspective view according to a fourth manner of embodiment.

FIGS. 7 and 8 are perspective views according to a fifth manner of embodiment, which illustrates the functioning of a means of crumpling.

FIG. 7 illustrates the device in a position designed to constrain the product.

FIG. 8 illustrates the device in a position designed to release the product.

DETAILED DESCRIPTION OF THE DISCLOSURE

This way, device (1) for production of stuffing or padding component according to the invention comprises a guide means, a drive means and a means for crumpling the product.

According to one characteristic, device (1) comprises a product supply means.

It is understood that a stuffing component could also be a padding component, making it possible to surround, pad or even to stuff the free spaces in a carton around the item(s) to be packed.

Device (1) according to the invention is designed to be supplied with at least one product, as described in greater detail in the remainder of the description, as an example, devices (1) illustrated in FIGS. 1 through 3, are intended to be supplied with a sheet of paper, whereas devices (1) illustrated in FIGS. 6 and 7 are intended to be supplied simultaneously by two sheets of paper intended to be stacked during the crumpling operation.

The product is shown advantageously as a strip or sheet of craft paper, comprising perforation lines, advantageously wound on a roller or an accordion-folded paper strip.

In the remainder of the description, the terms “sheet”, “strip” or “product” will be used to designate the same entity to be crumpled.

The raw material is to be considered a product until the final product is achieved, namely a finalized stuffing or padding component.

We add here that the means of crumpling could be considered as a means of sequential obstruction, which blocks the travel of the paper driven by the drive means along the guide means.

The means of crumpling can thus adopter at least two positions, a position constraining the product, designed to obstruct the travel of at least one sheet of paper and crumple the latter while the product is moving and/or during the movement of the means of crumpling in contact with the product, until it reaches a position that no longer constrains the product, designed to allow the crumpled paper to travel downstream from the means of crumpling for it to be evacuated.

This way, the position that no longer constrains the product, may allow the product to travel freely, in the guide means, towards its evacuation point, so as to avoid all risk of jamming of the product both in the drive means and in the means of crumpling along the guide body.

In other words, the means of crumpling is designed to be alternatively in a contact position that constrains the product and a position in which the means of crumpling is retracted by at least one back-and-forth motion of the retracted position to the crumpling position in and of itself.

This way, the position in which the means of crumpling does not constrain the travel of the product could be considered to be a retracted position or a release position of the product.

A “retracted position” shall be taken to mean a release position of the product, a withdrawn position, namely a position of the means of crumpling which is no longer in contact with the product or a position in contact with the product but in a position where the means of crumpling does not exert any force against the product, leaving free its evacuation downstream from the means of crumpling.

The free evacuation of the stuffing product by the means of crumpling makes it possible to avoid damaging the structure of the final product.

The means of crumpling is thus at least moveable along a vertical axis (Z) perpendicular to drive axis (Y) which is parallel to the travel of the product.

In the remainder of the description, the term “drive axis (Y)” shall be understood to be an axis oriented in the direction of product travel, the term “transverse axis (X)”, an axis oriented perpendicular to drive axis (Y) included largely in the mean plane of product travel, and the term “vertical axis (Z)”, an axis that is perpendicular to drive axis (Y) and transverse axis (X).

It shall likewise be understood that the mean plane of travel of the product is the plane including the drive axis (Y) and the transverse axis (X).

Device (1) according to the invention could be positioned horizontally, namely that the product travel is directed parallel to the ground, or positioned vertically, namely that the product travel is directed downwards perpendicular or largely perpendicular to the ground.

To standardize the description, the axis that is perpendicular to the mean travel plane of the product, no matter what the positioning of device (1) is called vertical axis (Z).

The means of crumpling and the drive means can be powered by an electromagnetic means, such as rotating and/or linear motors, pneumatic means or even hydraulic means.

The movements of the means of crumpling and of the drive means may be of a continuously circular type, of a linear back-and-forth type and/or of a circular back-and-forth type.

The means of release of the product by the means of crumpling may be enacted sequentially, by pair control, by controlling the height of the crumpling folds and/or by controlling the number of crumpling folds in the product using control cells.

The means of crumpling can thus adopt at least two positions, a position that constrains the product, designed to obstruct the travel of at least one sheet of paper and crumple the latter while the product is moving and/or while the means of crumpling is moving in contact with the product, and a product release position, namely a retracted position, intended to allow the crumpled paper to travel downstream from the means of crumpling for its evacuation.

This way, retracting the means of crumpling leaves the product free to travel, in the guide means, towards its evacuation in order to avoid the risk of jamming the latter.

According to one additional characteristic, the means of crumpling is enslaved for example to a servomotor, controlling the passage of the position constraining the product to the release position when the means of crumpling is subjected to a predetermined force, releasing the product when the limit force is reached.

We restate here that a servomotor is a specific motor that is characterized by its capacity to maintain an opposition to a static force and whose position is continuously checked and corrected depending on the measurement. For the enslavement and control of the motor, the servomotor combines, in the same housing, the mechanical and the electrical.

According to one additional characteristic, the means of crumpling and the drive means are connected by a control cell, controlling the torques that the motors are subjected to from the means of crumpling and/or the drive means.

This way, according to the preceding characteristics, the means of crumpling is controlled electronically and advantageously using a computer.

We note here that the drive means is likewise controlled electronically and advantageously using a computer.

In other words, the back-and-forth motion of the means of crumpling, in a position constraining the product and a position releasing the product, is controlled by a control cell.

Control of the means of crumpling is considered to be active, contrary to a passive means of control such as a spring.

According to one characteristic, the back-and-forth motion of the means of crumpling is thus controlled by external electronic components, namely a motor, an engine control board and a PLC as a control cell.

In the same way, the drive means is controlled by an outside component, namely a motor, an engine control board and a PLC.

We point out here that according to one manner of embodiment, device (1) according to the invention comprises a PLC that controls the different engine control boards.

As a remark, a conventional production device for paper stuffing components comprises a series of toothed gears as a means of crumpling, fixed along a vertical axis perpendicular to the plane of product travel.

A toothed gear has the capability of blocking the product travel, but the blockage of the paper would impede the rotation of the gear as well as the function of the machine.

Moreover, a conventional device comprising a toothed gear as a means of crumpling, in which a significant crumpling of the product would be carried out upstream of the toothed gear, would cause a jamming of the machine, given that the crumpled paper would not be able to travel downstream from the toothed gear.

We point out here that in a conventional device, the product is lightly crumpled between the drive means and at least one toothed gear.

We also note here that a conventional production device of stuffing component, in general is not adapted to be moveable along a vertical axis (Z) and therefore cannot allow the product to be evacuated freely at the guide means.

According to one additional characteristic, the means of crumpling according to the invention is moveable along a transverse axis (X) perpendicular to drive axis (Y).

According to one other characteristic, the means of crumpling is moveable along drive axis (Y).

According to one manner of execution, the means of crumpling is moveable along vertical axis (Z) and along drive axis (Y).

According to another manner of execution, the means of crumpling is moveable along vertical axis (Z) and along transverse axis (X).

According to another advantageous manner of embodiment, the means of crumpling is moveable along vertical axis (Z) and at the same time along transverse axis (X) and along drive axis (Y).

According to one advantageous characteristic, the means of crumpling comprises a crumpling flap (2) fastened to a shaft (4) or to a crumpling rod (3).

According to the manners of embodiment illustrated in FIGS. 1 through 6, the means of crumpling comprises a crumpling flap (2).

According to the manner of embodiment illustrated in FIGS. 7 and 8, the means of crumpling comprises a crumpling rod (3).

We add here that a crumpling flap (2) is moveable along a vertical axis (Z) and along one drive axis (Y) in a rotational motion.

According to one manner of execution, shaft (4) advantageously pivots in both rotational directions.

According to the preceding manner of execution, the rotational displacement of a crumpling flap (2) makes it possible to block the crumpling, in the down position, in intermediate positions and/or and in the down position in contact with the product and the complete release of the product in a fully retracted position.

According to one additional characteristic, a crumpling flap (2) is moveable along a transverse axis (X) in a translational motion.

According to the preceding characteristic, a crumpling flap (2) is moveable along a transverse axis (X) in a translational motion, for example by the presence of a linear motor connected to shaft (4) fastening the crumpling flap (2).

We point out here that a crumpling flap (2) is a piece mounted so that it pivots on shaft (4) or integral to shaft (4) which is mounted movably in rotation, whose free end is designed to constrain the product at least along vertical axis (Z).

More precisely, according to the manners of embodiment illustrated in FIGS. 1 through 6, one of the ends of each of shafts (4) equipped with crumpling flaps (2) is connected to two bearings which are connected to the shaft of a rotating motor. Each of the rotating motors being connected to an engine control board which are controlled by a PLC as a control cell.

According to the manners of embodiment illustrated, the free end of a crumpling flap (2) and of a crumpling rod (3) are rounded in order to avoid damaging the sheet of paper when the crumpling flap (2) and the crumpling rod (3) are being placed in contact with the product.

As illustrated in FIGS. 7 and 8, a crumpling rod (3) is oriented in the direction of the product and is moveable along vertical axis (Z), advantageously along drive axis (Y) and advantageously along transverse axis (X) by translational movements.

According to one manner of execution, a crumpling rod (3) is moveable along vertical axis (Z) and along drive axis (Y).

According to another manner of execution, a crumpling rod (3) is moveable along vertical axis (Z) and transverse axis (X).

According to the manner of embodiment illustrated in FIGS. 7 and 8, a crumpling rod (3) is moveable both along vertical axis (Z), drive axis (Y) and transverse axis (X) by translational movements.

According to some manners of embodiment, the aforementioned translation movements are enacted by linear motors connected to a crumpling rod (3) and/or to a series of crumpling rods.

According to one additional characteristic, the means of crumpling comprises a series of crumpling flaps (2) or crumpling rods (3) aligned along a transverse axis (X) perpendicular to drive axis (Y).

According to the preceding characteristic, crumpling flaps (2) in a series are fastened to a shaft (4), whereas crumpling rods (3) in a series are fastened for example to a plate (14).

More precisely, according to the manner of embodiment illustrated in FIGS. 7 and 8, a series of crumpling rods (3) are aligned along a common axis, one of whose ends of the series is inserted in the plate (14). This end is connected to at least one linear motor connected to an engine control board and a PLC.

According to the manners of embodiment illustrated in FIGS. 1 through 6, shaft (4) with a series of crumpling flaps (2) fastened to it, is moveable in rotation by back-and-forth motions.

According to a first alternative of the manners of embodiment illustrated in FIGS. 1 through 6, shaft (4) is likewise moveable in translation along a transverse axis (X) by back-and-forth movements.

According to the preceding alternative, the crumpling flaps (2) in a series each follow the same translational back-and-forth movement along a transverse axis (X).

According to a second alternative of the manners of embodiment illustrated in FIGS. 1 through 6, a pair of crumpling flaps (2) in a series are moveable along a transverse axis (X) as they get closer to each other.

In other words, according to the preceding alternative, the crumpling flaps (2) in a series are moveable two by two by a translational movement getting closer along a transverse axis (X).

To this end, each of the crumpling flaps (2) or each of the pairs of crumpling flaps (2) in a series are mounted movably and independently onto shaft (4), at least along transverse axis (X) following shaft (4) to which they are fastened.

According to the manner of embodiment illustrated in FIGS. 7 and 8, the crumpling rods (3) are moveable within the plate (14) along a transverse axis (X) and along a drive axis (Y), and either along a vertical axis (Z) or the plate is moveable along a vertical axis (Z).

The crumpling rods (3) and the crumpling flaps (2) are for example moveable in translation by linear motors, not shown.

According to the preceding manners of embodiment, the means of crumpling comprises a multitude of series of crumpling flaps (2) or crumpling rods (3), mounted on shafts (4) or parallel plates along the length of the drive axis (Y).

This latter characteristic makes it possible to simultaneously crumple a greater part of the product and to evenly distribute the crumpling along the product for the purpose of producing stuffing and padding components with a greater yield.

According to some manners of embodiment, the crumpling flaps (2) or the crumpling rods (3) of a first series are respectively offset along the drive axis (Y) relative of those in a second series.

According to other manners of embodiment, the crumpling flaps (2) or the crumpling rods (3) of a first series are respectively aligned along drive axis (Y) relative to those in a second series.

We add here that the means of crumpling could be located on one side of the product along vertical axis (Z) or on either side of the product, opposite from or offset along the mean plane of product travel, namely the plane including drive axis (Y) and transverse axis (X).

As illustrated in FIGS. 1 through 8, the means of crumpling is located on either side of the product.

According to the manners of embodiment illustrated in FIGS. 1 through 6, a first series of crumpling flaps (2) is located opposite relative to a second series of crumpling flaps (2), with the crumpling flaps (2) of each of the series being aligned along a vertical axis (Z).

According to the preceding manners of embodiment, each of shafts (4) to which a series of crumpling flaps (2) is fastened, is arranged in parallel with and equidistant from the mean plane of product travel.

According to one additional characteristic, the crumpling flaps (2) or the crumpling rods (3) of two adjacent series can work according to the crumpling sequences, getting closer to or further away from each other.

Device (1) comprises a control unit that directs the crumpling sequences of crumpling flaps (2) or crumpling rods (3) in the same series and numbers of series relative to each other.

Control of different sequences during a crumpling cycle results in stuffing or padding components that have different structures.

We restate here that device (1) comprises a supply means and a guide means.

The supply means comprises a shaping block (5), also called a shaper.

We note here that the shaping block (5) comprises at least one slot (6) designed to admit and shape the paper strip.

According to the manners of embodiment illustrated in FIGS. 1 through 5, shaping block (5) of the supply means comprises a straight slot (6) through which a product, preferably a strip of paper, is designed to pass.

According to the manners of embodiment illustrated in FIGS. 6 through 8, shaping block (5) comprises two parallel slots (6) that are each designed to be supplied with a sheet of paper.

We add here that the guide means comprises at least one crumpling guide (7) of which at least one part of a longitudinal section [is] pointed in the direction of a drive axis (Y).

We note here that the longitudinal parts of a multitude of crumpling guides (7) are arranged in parallel.

The crumpling guides (7) may have any shape of cross-section, such as circular, rectangular, square, oblong, even triangular or hexagonal, preferably circular as illustrated notably in FIGS. 1 through 8.

According to the manners of embodiments illustrated, a crumpling guide (7) is mechanically fastened at one of its ends in direct connection with shaping block (5) of the supply means, whereas its other end is free or at least not fastened mechanically, as explained in greater detail in the remainder of the description.

According to the preceding manners of embodiment, the other end of the crumpling guide (7) is free in order to leave a peripheral space around the guide means for the free circulation of the crumpled product or the stuffing or padding component, once the means of crumpling is in the release position.

The latter characteristic, in combination with the retracting of the means of crumpling, makes it possible to avoid all jamming of the paper in the machine, by leaving free the evacuation passage for the stuffing or padding component produced in this way, at the free end of the guide means, as well as vertically aligned with the means of crumpling.

According to the manners of embodiment illustrated, the crumpling guide (7) is centered along the mean plane of product travel.

According to the first manner of embodiment, crumpling guides (7) are centered along vertical axis (Z) relative to shafts (4) of the series of crumpling flaps (2), namely that the shafts (4) are equidistant from either side of the guide sections (7).

According to another characteristic, the guide means comprises product shaping rods (8).

According to the first manner of embodiment, the shaping rods (8) are connected at one of their ends to shaping block (5), whereas their other respective ends are free and oriented towards the mean plane of product passage, namely in the direction of crumpling guides (7).

We note here that the shaping rods (8) are intended to orient the product in the direction of crumpling guides (7) at the output of the supply means, more precisely when they come out of the slot (6) in shaping block (5).

According to the manner of embodiment illustrated in FIG. 1, the guide means comprises crumpling guides (7) and shaping rods (8).

According to the manner of embodiment illustrated in FIG. 2, the first part of crumpling guides (7) is considered to be shaping rods (8), whereas the second parts downstream from the first parts are crumpling guides (7) in and of themselves, arranged in parallel with each other.

It is understood that the guide means of the illustrated manners of embodiments are inter-changeable amongst each other, without leaving the scope of the invention, namely that longitudinal guide rods (7) [sic] and shaping rods (8) [sic] can be mounted on device (1) comprising crumpling rods (3), whereas crumpling guides (7) [sic] in two parts, with the first parts being shaping guides (8) [sic] and the second parts being crumpling guides [sic] (7) in and of themselves maybe assembled onto a device (1) that comprises crumpling flaps (2).

We add here that the means of crumpling advantageously comprises an additional crumpling guide (9), as illustrated in FIG. 1, located above and/or below, or even on one side or the other, depending on the orientation of the device, of the crumpling guides.

We point out here that according to the manner of embodiment illustrated in FIG. 1, device (1) comprises an additional crumpling guide (9) located above crumpling guides (7).

We note here that an additional crumpling guide (9) is not in contact with the crumpling guides (7) and makes it possible to constrain, along vertical axis (Z), the product in order to crumple it, so that the crumpled paper cannot rise above a defined distance, so that regular crumpling is achieved as defined by the crumpling sequences in the control cell.

We point out here that an additional crumpling guide (9) is located upstream of the means of crumpling, namely the crumpling flaps (2) or crumpling rods (3).

We also point out here that in the case of a great many series crumpling flaps (2) or crumpling rods (3), an additional crumpling guide (9) is of adequate size and is located along drive axis (Y) between the aforementioned series and the spaces between the crumpling guides (7) so that the sequential movements of the crumpling flaps (2) or crumpling rods (3) are not impeded.

According to the manner of embodiment illustrated in FIG. 1, le additional crumpling guide (9) has a shape that is complementary to those of the spaces between the crumpling guides (7), in such manner that it is positioned in a manner that is offset from the crumpling guides (7), in order to restrain the product from contact with the crumpling guides (7).

According to the preceding manner of embodiment, since the crumpling guides (7) are cylinders that are aligned along drive axis (Y), with the additional crumpling guide (9) being a succession de cylinders or shortened cylinders, each positioned vertically aligned with the interspaces between the pairs of crumpling guides (7).

The drive means is designed advantageously to roll out or drive the product via the supply means, more precisely through at least one slot (6) in shaping block (5) and to drive it in the direction of the means of crumpling.

According to some manners of embodiment and in a conventional manner, as illustrated in FIGS. 1, 2, 6 and 7, the drive means comprises a set of drive wheels (10) arranged opposite each other relative to the mean plane of product travel.

More precisely, each of the shafts (4) in a series of drive wheels (10) is connected to a pinion, with the shaft pinions being engaged with each other. The shafts (4) therefore turn in the opposite direction from each other. One of the shafts (4) of a series of drive wheels (10) is connected to a rotating motor that is connected to an engine control board and a PLC.

According to the preceding manners of embodiment, the set of drive wheels (10) are [sic] located in a space between two crumpling guides (7).

We note here that the drive wheels (10) permanently engage the product when the device (1) is functioning according to the invention.

It is understood that the drive means is arranged upstream of the means of crumpling.

According to the manners of embodiment illustrated, the drive means is located between the supply means and the means of crumpling, more precisely between shaping block (5) and the means of crumpling.

According to the manners of embodiment illustrated in FIGS. 3 through 5, the drive means is a drive means in translation, designed to function sequentially.

The drive means illustrated in FIGS. 3 through 5, is moveable both in translation along drive axis (Y) and along vertical axis (Z).

More precisely, the aforementioned drive means is retractable either by translation along vertical axis (Z) or by pivoting, and, in all cases, is moveable in translation along drive axis (Y).

These aforementioned drive means make it possible to release the product after it has traveled in the direction of the means of crumpling and after the crumpling sequence, making it possible to avoid a risk of jamming the product.

The product is thus released after the travel and crumpling sequences both by the drive means and by the means of crumpling in the guide means.

According to a first alternative of the preceding manner of embodiment, the drive means comprises a drive flap (11), preferably a series of drive flaps (11), mounted moveably along a shaft (4) that is moveable in rotation, whereas shaft (4) is likewise moveable in translation along drive axis (Y).

We point out here that shaft (4) to which a drive flap (11) is fastened is, for example, as illustrated in FIG. 3, set in a slot that is oriented parallel to drive axis (Y) arranged in a plate located perpendicular to the mean plane of product travel.

As illustrated in FIGS. 3 through 5, the drive flaps (11) are located between the crumpling guides (7), more precisely between the interspaces of crumpling guides (7).

According to the preceding alternative, the drive means comprises a pair of drive flaps (11), more precisely a series of pairs of drive flaps (11), with their respective free ends being located facing each other in opposition relative to the mean plane of product travel.

We note here that while the product is being driven, the respective ends of the pair of drive flaps (11) are in contact with the product in a constrained manner, given its travel.

A drive flap (11) can adapt at least three positions, namely an "up" rest position in which the drive flap (11) is retracted, since the free end of the drive flap (11) is not in contact with the product, as illustrated in FIG. 5, as well as a "down" contact position of the free end of the drive flap (11) with the product by the rotation of shaft (4), as illustrated in FIG. 3, followed by a drive position of the product by the translation of shaft (4) along drive axis (Y), parallel to the median plane of product travel, in the direction of the means of crumpling, as illustrated in FIG. 4.

This motion also comprises the retracting of the drive flaps (11) then their return to their start position by translation of shaft (4) in the direction of the supply means, as illustrated in FIG. 5.

According to a second alternative of the preceding manner of embodiment, not shown, the drive means comprises a drive body that is moveable only according to translational movements, more preferentially comprises a series of drive bodies located vertically aligned with the interspaces between pairs of crumpling guides (7).

We add here that a drive body is moveable along a vertical axis (Z) and along a drive axis (Y).

A drive body can adopt at least two positions namely a first contact position, in which the drive body is in contact with the product, and a second, retracted rest position, where the drive body is no longer in contact with the product.

The term "first contact position" shall be understood to mean a position constraining the product and a second retracted position, a product release position, as explained previously.

The drive body is designed to follow a motion of product travel, in which the drive body is at first in a second, retracted position, then is subjected to a vertical translation along a vertical axis (Z) in order to adopt the first contact position, then is subjected to a translation along a drive axis (Y) to move the product in the direction of the means of crumpling.

This motion also comprises the lifting of the drive body then its return to its start position by translation in the direction of the supply means.

According to the preceding manner of embodiment, the drive means comprises a pair of drive bodies, advantageously a series of pairs of drive bodies, with their respective free end [sic] being located facing each other in opposition relative to the mean plane of product travel.

According to one advantageous characteristic, the drive means is designed to drive the product in both directions, namely in the forward direction and in the backward direction so that the product can be cut off.

We restate here that the product advantageously comprises perforation lines.

To this end, when the drive means makes the product back up and the means of crumpling is in the product blocking position, namely in a position constraining the product, the product is torn along a line of perforations located between the drive means and the means of crumpling.

This way, according to the manners of embodiment illustrated, a drive wheel (10), a drive flap (11) or a drive body are adapted to proceed towards the motions of product travel in the direction of the means of crumpling and withdrawal in the direction of the supply means, so that the product is torn along a perforated line.

This way, when the means of crumpling is in a first blockage position of product travel, a drive wheel (10) is designed to turn in the opposite direction of product drive, and a drive flap (11) or a drive body in the first contact position is designed to be subjected to a translation along one drive axis (Y) in the direction of the supply means, in view of the cutout of the product by traction of this latter.

This way, the means of cutting out the product according to device (1) according to the invention comprises a means of blockage and a means of traction in the opposite direction of product travel.

We point out here that the means of blockage is the means of blocking is realized by the means of crumpling in a position constraining the product, whereas the means of traction is represented by the drive means.

We restate here that the crumpling guides (7) are mechanically fastened at one of their ends to shaping block (5) of the supply means, whereas their other end is free.

According to one additional characteristic, depending on the length and diameter or the cross-section of the shapes of the crumpling guides (7), the crumpling guides (7) are held by magnetic repulsion forces, more precisely by magnetic repulsion or by multi-axial suspension.

We add here that the degrees of mechanical freedom at one of the ends of the crumpling guides (7) are blocked by the magnetic forces that hold their respective free ends.

According to the preceding characteristic, at least one part of the crumpling guide (7) comprises a permanent magnet (12) or an electro-magnet.

According to the manner of embodiment illustrated in FIG. 2, a crumpling guide (7) comprises a permanent magnet (12) at its free end.

According to the preceding manner of embodiment, the poles of a permanent magnet (12) are oriented perpendicular to the mean plane of product travel.

Device (1) thus comprises a means of mechanical support around at least one part of the outside of a crumpling guide (7) located facing at least one permanent magnet (12) or an electromagnet arranged within or at the outside of at least one part of a crumpling guide (7).

According to the manner of embodiment illustrated in FIG. 2, the means of mechanical support is represented by a bar (13) comprising, as an example, permanent magnets (12) located facing each of the permanent magnets (12) located on the crumpling guides (7).

According to another manner of embodiment illustrated in FIG. 6, the means of mechanical support is represented by two parallel bars (13), in which are arranged at least one part of crumpling guides (7), in such manner that a space forms between the crumpling guides (7) and the bars (13).

We point out here that in order to obtain a magnetic support by repulsion, the poles of the same polarity as permanent magnets (12) respectively arranged on a crumpling guide (7) and bar (13) are arranged so that they face each other.

The latter characteristic makes it possible to keep crumpling guides (7) all along the functioning of device (1) according to the invention, while leaving a peripheral space around the crumpling guides (7) and in particular all along their area and likewise at their free end.

The invention claimed is:

1. A device for production of stuffing product, comprising a product guide means, a product drive means along a drive axis (Y), and a means of crumpling the product, where the means of crumpling the product is designed to be alternatively, by a back-and-forth motion, in a position that constrains the product and a release position of the product, the release position is a retracted position, a withdrawn position of the means of crumpling, wherein the back-and-forth motion of the means of crumpling the product is controlled by a control cell.

2. The device according to claim 1, wherein the means of crumpling the product is controlled by a motor connected to an engine control board that is controlled by a Program Logic Controller (PLC).

3. The device according to claim 1, wherein the means of crumpling the product is moveable along a vertical axis (Z) perpendicular to drive axis (Y).

4. The device according to claim 1, wherein the means of crumpling the product is moveable along drive axis (Y).

5. The device according to claim 1, wherein the means of crumpling the product comprises a series of crumpling flaps or crumpling rods distributed along a transverse axis (X) perpendicular to drive axis (Y).

6. The device according to claim 1, wherein the drive means is configured so that it displaces one sheet of paper in both directions along drive axis (Y).

7. The device according to claim 1, wherein the guide means comprises crumpling guides that extend in the direction of drive axis (Y).

8. The device according to claim 7, wherein crumpling guides are attached at one end of the crumpling guides to a shaping block and are free at another end of the crumpling guides.

9. The device according to claim 7, wherein one of said crumpling guides is arranged facing the other of said crumpling guides and upstream of the means of crumpling the product.

* * * * *